US011597520B2

(12) United States Patent
Salmon et al.

(10) Patent No.: US 11,597,520 B2
(45) Date of Patent: Mar. 7, 2023

(54) COMPONENT POSITIONING SYSTEMS AND METHODS FOR AN INTERNAL CABIN OF VEHICLE

(71) Applicant: THE BOEING COMPANY, Chicago, IL (US)

(72) Inventors: James Jason Salmon, Kirkland, WA (US); Jeffrey Scott Roberts, Snohomish, WA (US); Patrick William O'Neill, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 650 days.

(21) Appl. No.: 16/671,238

(22) Filed: Nov. 1, 2019

(65) Prior Publication Data

US 2020/0307796 A1 Oct. 1, 2020

Related U.S. Application Data

(60) Provisional application No. 62/825,978, filed on Mar. 29, 2019.

(51) Int. Cl.
*B64D 11/00* (2006.01)
*B64D 11/06* (2006.01)

(52) U.S. Cl.
CPC ...... *B64D 11/00155* (2014.12); *B64D 11/064* (2014.12)

(58) Field of Classification Search
CPC ................. B64D 11/00155; B64D 11/064
See application file for complete search history.

(56) References Cited

U.S. PATENT DOCUMENTS

| 7,713,009 | B2 | 5/2010 | Hudson |
| 7,785,053 | B2 | 8/2010 | Hudson |
| 8,128,326 | B2 | 3/2012 | Hudson |
| 8,267,557 | B2* | 9/2012 | Vogel ............... B64D 11/00 |
| | | | 362/477 |
| 8,401,742 | B2 | 3/2013 | Mayer |
| 8,920,085 | B2 | 12/2014 | Hudson |
| 9,567,086 | B2 | 2/2017 | Siegmeth |
| 2006/0032979 | A1 | 2/2006 | Mitchell |

(Continued)

FOREIGN PATENT DOCUMENTS

DE 102007052598 5/2008

OTHER PUBLICATIONS

Extended European Search Report for EP 20166002.4-1010, dated Sep. 7, 2020.

(Continued)

*Primary Examiner* — Anthony D Barfield
(74) *Attorney, Agent, or Firm* — The Small Patent Law Group LLC; Joseph M. Butscher

(57) ABSTRACT

A component positioning system and method are configured to facilitate positioning of a component (such as a seat assembly) on a seat track within an internal cabin of a vehicle. The component positioning system and method include a component, and a position indicator coupled to a portion of the component. The position indicator emits a proper position indication when the component is in a proper position in relation to the seat track. The position indicator emits a remedial position indication when the component is not in the proper position with respect to the seat track.

20 Claims, 6 Drawing Sheets

(56) References Cited

U.S. PATENT DOCUMENTS

2011/0017869 A1    1/2011  Gonnsen
2015/0145300 A1*  5/2015  Finlay ................ B64D 11/0696
                                                297/257

OTHER PUBLICATIONS

Communication pursuant to Article 94(30 EPC for EP App. No. 20166-2.4-1010, dated Mar. 30, 2022.
U.S. Appl. No. 16/365,788, filed Mar. 27, 2019.
U.S. Appl. No. 16/365,777, filed Mar. 27, 2019.
U.S. Appl. No. 16/529,921, filed Aug. 2, 2019.
U.S. Appl. No. 16/529,935, filed Aug. 2, 2019.
U.S. Appl. No. 16/671,226, filed Nov. 1, 2019.
U.S. Appl. No. 16/529,946, filed Aug. 2, 2019.
U.S. Appl. No. 16/529,957, filed Aug. 2, 2019.
U.S. Appl. No. 16/368,925, filed Mar. 29, 2019.
U.S. Appl. No. 16/367,314, filed Mar. 28, 2019.
U.S. Appl. No. 16/368,934, filed Mar. 29, 2019.

* cited by examiner

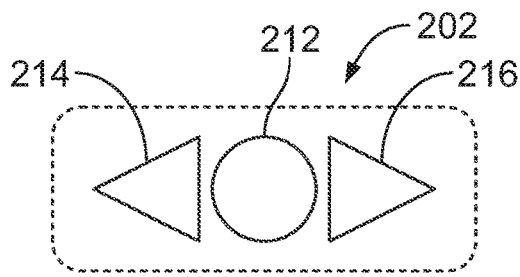
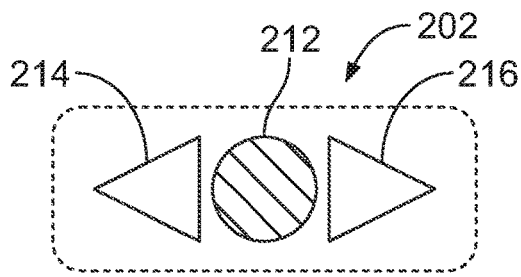
FIG. 8  FIG. 9
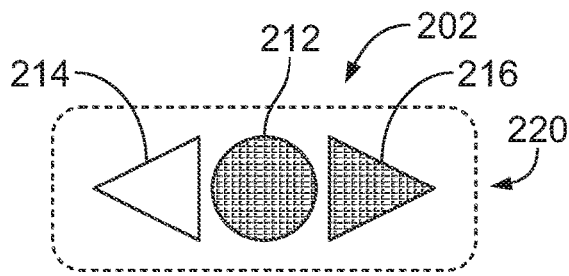
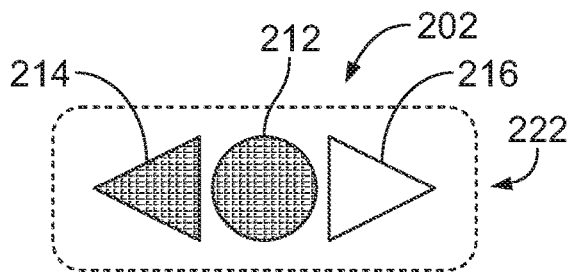
FIG. 10  FIG. 11
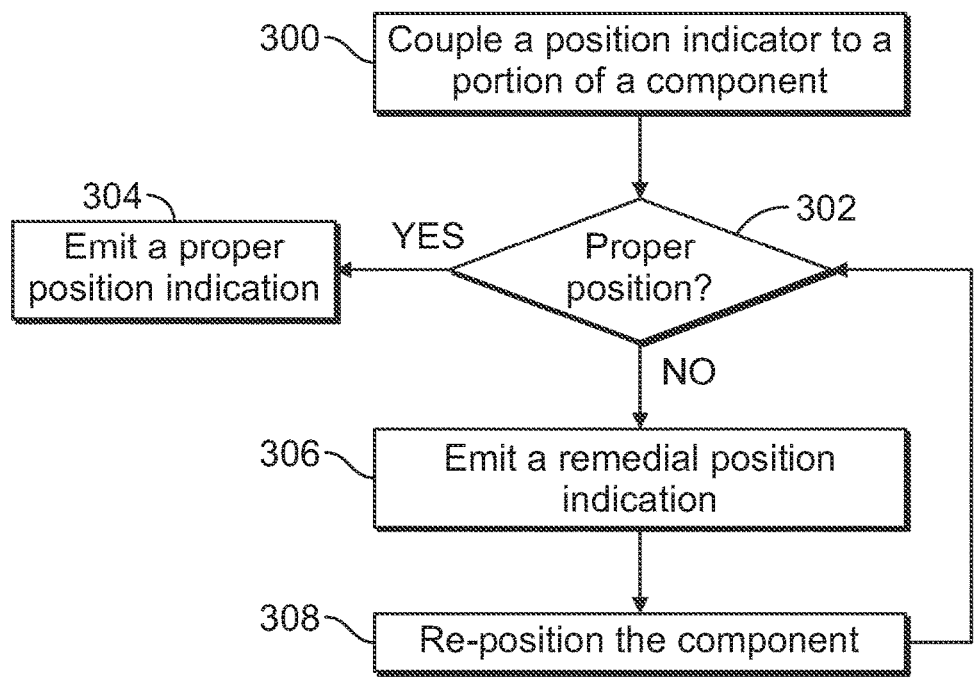
FIG. 12

COMPONENT POSITIONING SYSTEMS AND METHODS FOR AN INTERNAL CABIN OF VEHICLE

RELATED APPLICATIONS

This application relates to and claims priority benefits from U.S. Provisional Patent Application No. 62/825,978, entitled "Seat Positioning Systems and Methods," filed Mar. 29, 2019, which is hereby incorporated by reference in its entirety.

FIELD OF EMBODIMENTS OF THE DISCLOSURE

Embodiments of the present disclosure generally relate to component positioning systems and methods, and more particularly, to component positioning systems and methods that allow for efficient and reliable positioning of structural components (such as seats, monuments, passenger service units, and the like) within an internal cabin of a vehicle.

BACKGROUND OF THE DISCLOSURE

Commercial aircraft typically include an internal cabin that may be divided into numerous sections. A flight deck is generally separated from a passenger cabin, which may include a first class section, a business class section, an economy section, and the like. Each section within a passenger cabin may have a different spacing or pitch between rows of seats. For example, a first class section typically has a greater pitch between rows of seats as compared to an economy section.

As a commercial aircraft is being manufactured, passenger seats are secured within an internal cabin. Because a commercial aircraft may include different sections having different pitches between rows of seats, the process of positioning and securing seats at defined positions within an internal cabin is time and labor intensive. For example, in order to position a seat at a desired location within an internal cabin, an individual typically first measures a distance from a particular location to the define location for the seat.

Additionally, after the aircraft is manufactured and is in service, between flights of the aircraft, an operator may decide to reconfigure certain seating areas to adjust the pitch between certain rows of seats. For example, an operator may decide to change a row of an economy section into an economy plus section, or vice versa. The pitch between rows of the economy section may differ from the pitch between rows of the economy plus section. When the seats are reconfigured, care is taken to ensure that the seats are located at proper positions.

As noted, the process of properly positioning seats within an internal cabin is time and labor intensive. If one or more seats are positioned at even slightly different positions than preferred, defined locations, one or more sections within a commercial aircraft may be affected, in that spacing between different certain rows may not be as intended. Further, if there is a relatively short time until a subsequent flight, there may not be sufficient time to adjust the seats to new positions.

SUMMARY OF THE DISCLOSURE

A need exists for an efficient system and method for properly positioning components (such as seats) within an internal cabin of a vehicle. Further, a need exists for a system and method that allow for quick and efficient adjustment of components within an internal cabin.

With those needs in mind, certain embodiments of the present disclosure provide a component positioning system configured to facilitate positioning of a component in relation to a seat track within an internal cabin of a vehicle. The component positioning system includes a component, and a position indicator coupled to a portion of the component. The position indicator emits a proper position indication when the component is in a proper position in relation to the seat track. The position indicator emits a remedial position indication when the component is not in the proper position in relation to the seat track.

In at least one embodiment, the component is a seat assembly. The position indicator may be coupled to a leg of the seat assembly. The position indicator may be proximate to at least one securing stud that secures the component to the seat track.

In at least one embodiment, the component positioning system also includes a component positioning control unit. The component positioning control unit may be on or within the component. Optionally, the component positioning control unit may be remote from the component. In at least one embodiment, the position indicator includes the component positioning control unit.

In at least one embodiment, the component positioning control unit compares a current position of the component in relation to the seat track with stored proper position data for the component within the internal cabin.

As an example, the position indicator includes a status portion, and one or more corrector portions. The status portion and the correction portion(s) may include illuminators that are configured to be illuminated. The corrector portion(s) may include one or more arrows indicating directions for remedying an improper position of the component.

Certain embodiments of the present disclosure provide a component positioning method configured to facilitate positioning of a component in relation to a seat track within an internal cabin of a vehicle. The component positioning method includes coupling a position indicator to a portion of a component, emitting a proper position indication when the component is in a proper position in relation to the seat track, and emitting a remedial position indication when the component is not in the proper position in relation to the seat track.

Certain embodiments of the present disclosure provide a vehicle that includes an internal cabin, a seat track within the internal cabin, a component positioned in relation to the seat track, and a component positioning system configured to facilitate positioning of the component in relation to the seat track within the internal cabin. The component positioning system includes a position indicator coupled to a portion of the component, and a component positioning control unit that compares a current position of the component in relation to the seat track with stored proper position data for the component within the internal cabin. The position indicator emits a proper position indication when the component is in a proper position in relation to the seat track. The position indicator emits a remedial position indication when the component is not in the proper position in relation to the seat track.

BRIEF DESCRIPTION OF THE DRAWINGS

FIG. 8 illustrates a front view of a position indicator in a deactivated state, according to an embodiment of the present disclosure.

FIG. 9 illustrates a front view of the position indicator emitting a proper position indication, according to an embodiment of the present disclosure.

FIG. 10 illustrates a front view of the position indicator emitting a first remedial position indication, according to an embodiment of the present disclosure.

FIG. 11 illustrates a front view of the position indicator emitting a second remedial position indication, according to an embodiment of the present disclosure.

FIG. 12 illustrates a flow chart of a component positioning method configured to facilitate positioning of a component in relation to a seat track within an internal cabin of a vehicle, according to an embodiment of the present disclosure.

DETAILED DESCRIPTION OF THE DISCLOSURE

Figure 1:
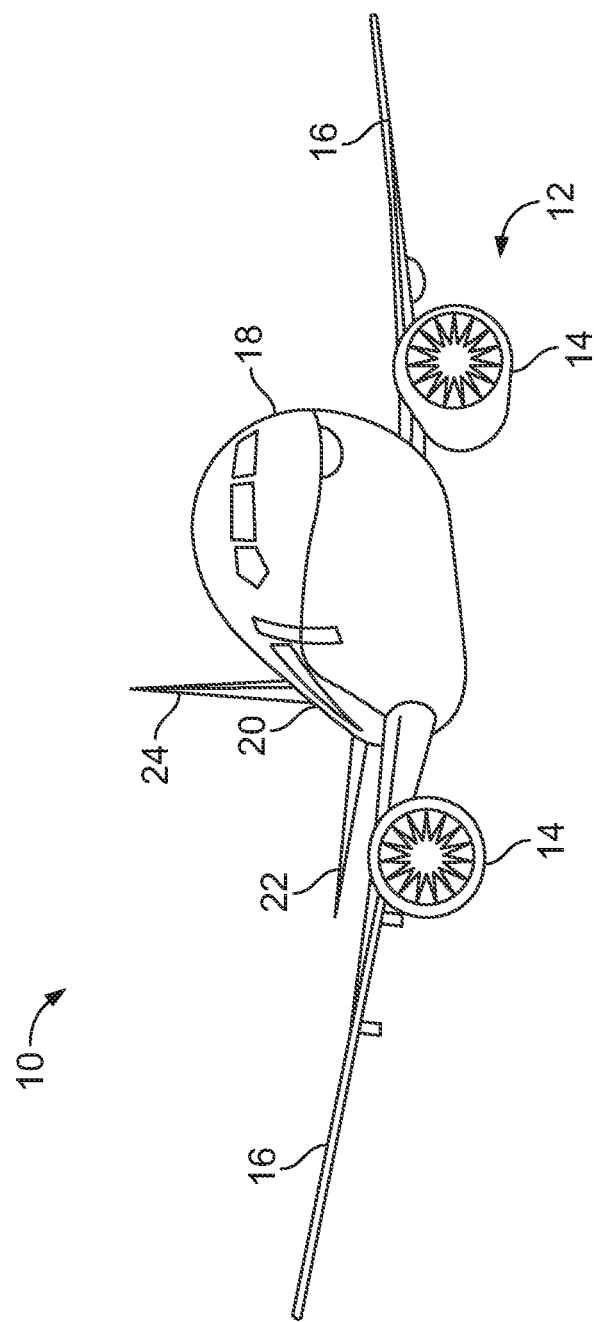
FIG. 1 illustrates a perspective front view of an aircraft, according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide seat positioning systems and methods that include at least one position indicator coupled to a portion of a seat assembly. For example, the position indicator may be coupled to a leg of the seat assembly. The position indicator is in communication with (and/or includes) a seat positioning control unit that compares the current position of the seat assembly with stored proper position data for the seat assembly within an internal cabin. The seat positioning control unit determines if the seat assembly is in the proper position, such as with respect to a seat track. If the seat assembly is in the proper position, the seat positioning control unit outputs a proper position signal to the position indicator. In response, the position indicator emits a proper position indication. If the seat assembly is not in the proper position, the seat positioning control unit outputs a remedial position signal to the position indicator, which indicates that the seat assembly is not in the proper position. In at least one embodiment, the remedial position signal may also indicate a direction of correction. In response, the position indicator emits a remedial position indication.

Certain embodiments of the present disclosure provide a component positioning system configured to facilitate positioning of a component (such as a seat assembly) on a seat track within an internal cabin of a vehicle. The component positioning system includes a component (such as the seat assembly), and a position indicator coupled to a portion of the component. The position indicator emits a proper position indication when the component is in a proper position in relation to the seat track. The position indicator emits a remedial position indication when the component is not in the proper position with respect to the seat track.

Certain embodiments of the present disclosure provide a component positioning method configured to facilitate positioning of a component on a seat track within an internal cabin of a vehicle. The component positioning method includes coupling a position indicator to a portion of the component, emitting (by the position indicator) a proper position indication when the component is in a proper position in relation to the seat track, and emitting (by the position indicator) a remedial position indication when the component is not in the proper position with respect to the seat track.

FIG. 1 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a flight deck, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
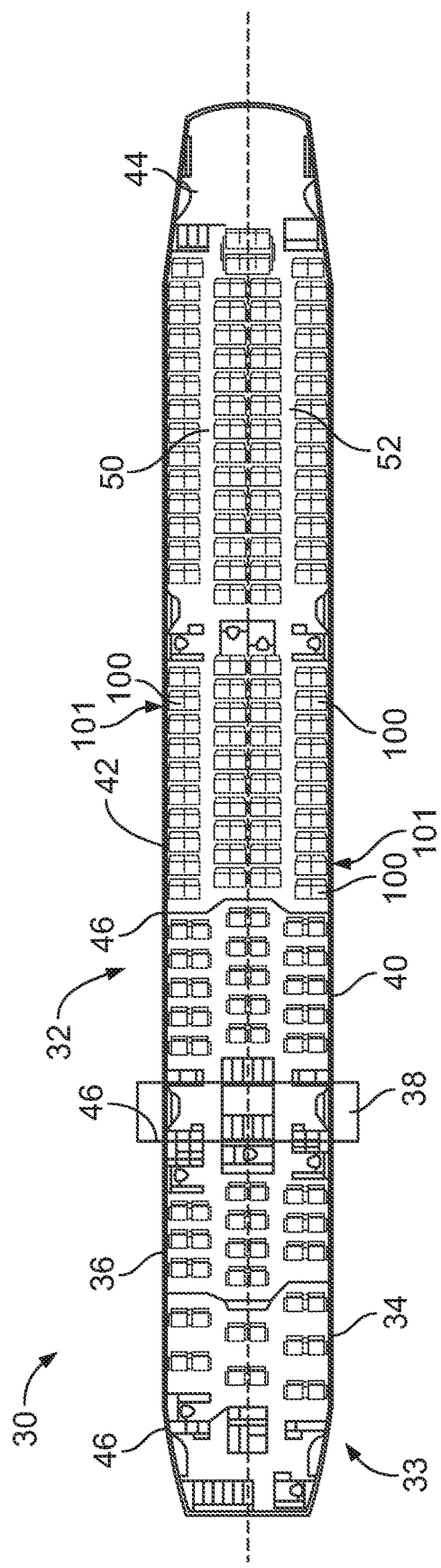
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Components (such as seat assemblies 100, galleys, lavatories, closets, PSUs, stowage bins, and the like) are positioned throughout the internal cabin 30. The seat assemblies 100 may be arranged in rows 101.

Figure 2B:
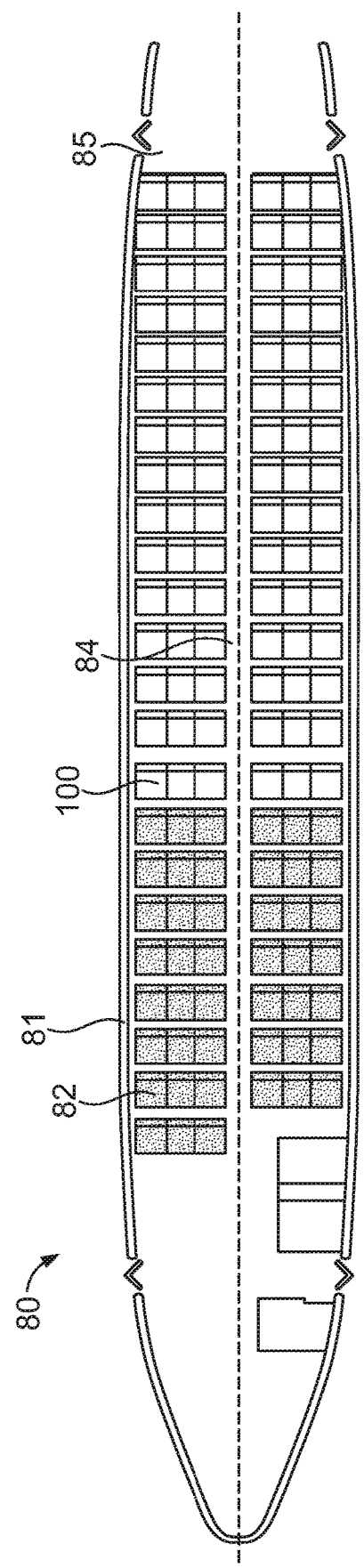
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having seat assemblies 100, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

Figure 3:
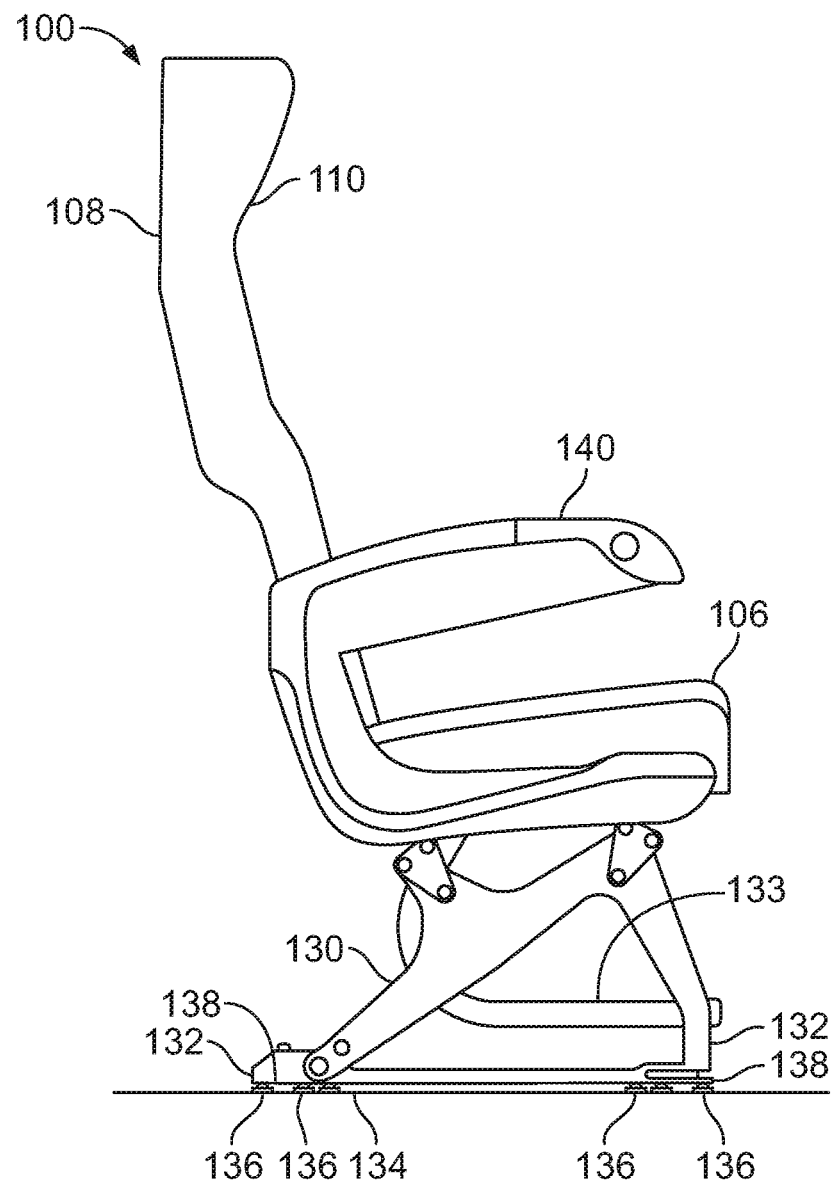
FIG. 3 illustrates a side view of a seat assembly, according to an embodiment of the present disclosure.

FIG. 3 illustrates a side view of a seat assembly 100, according to an embodiment of the present disclosure. The seat assembly 100 is an example of a component that is within an internal cabin of a vehicle. The seat assembly 100 is configured to be secured within the internal cabin of a vehicle, such as a commercial aircraft.

The seat assembly 100 includes a base 130, which may include legs 132 that may be secured to seat tracks 134 within an internal cabin of a vehicle. The legs 132 on a same side of the seat assembly 100 may be connected together by a spanner bar 133. In at least one embodiment, securing studs 136 (such as shear studs) downwardly extend from lower surfaces 138 of the legs 132. The securing studs 136 are securely retained within the seat tracks 134. The seat tracks 134 are configured to securely couple to the securing studs 136 to secure the seat assembly 100 in place. The base 130 supports a seat cushion 106 and a backrest 108, which includes a headrest 110. Arm rests 140 may be pivotally secured to the backrest 108.

The seat assembly 100 may be sized and shaped differently than shown in FIG. 3. The seat assembly 100 may include more or less parts than shown in FIG. 3. It is to be understood that the seat assembly 100 shown in FIG. 3 is merely one example of a seat assembly that may be disposed within an internal cabin of a vehicle.

As described herein, the seat assembly 100 is an example of a component that includes at least one position indicator in communication with (and/or including) a component positioning control unit. A component positioning system includes the seat assembly 100, the position indicator, and the component positioning control unit. In at least one embodiment, the component positioning system includes a component (such as a seat assembly, a monument (for example, a lavatory, a closet, a galley, or the like), a passenger service unit (PSU), a stowage bin assembly, or the like), a position indicator coupled to the component, and a component positioning control unit. For example, a seat positioning control unit is an example of a component positioning control unit.

Figure 4:
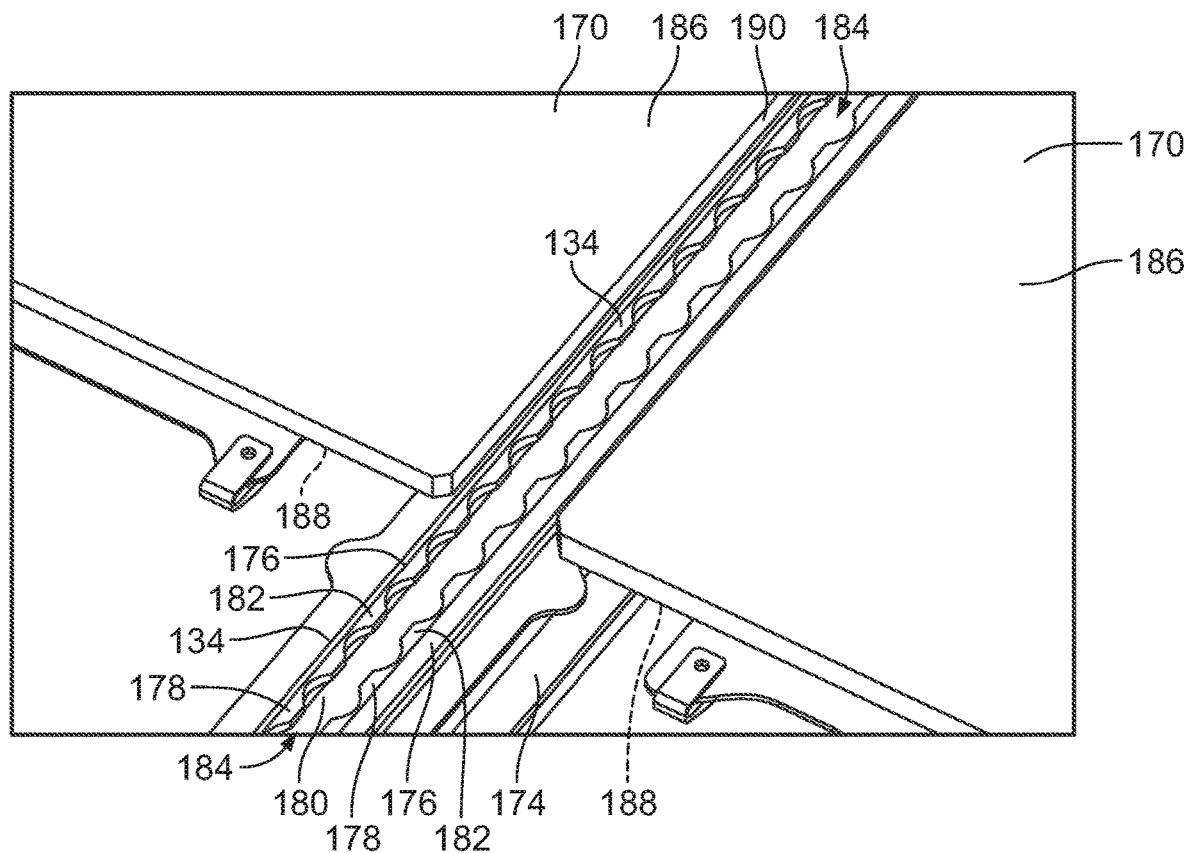
FIG. 4 illustrates a perspective top view of a seat track secured between floor panels, according to an embodiment of the present disclosure.

FIG. 4 illustrates a perspective top view of the seat track 134 secured between floor panels 170, according to an embodiment of the present disclosure. The seat track 134 includes a base 174 and lateral walls 176 extending upwardly from the base 174. A retaining lip 178 inwardly extends from a top end of each lateral wall 176, such as at a ninety-degree angle. The retaining lips 178 cooperate to form a series of expanded openings 180 and retaining arms 182 over a track channel 184. The expanded openings 180 and retaining arms 182 alternate over a length of the seat track 134. That is, two expanded openings 180 are separated by a retaining arm 182.

The floor panels 170 include upper planar support surfaces 186 opposite from lower surfaces 188. The upper planar surface surfaces 186 connect to the lower surfaces 188 at edges, such as interior edges 190.

Figure 5:
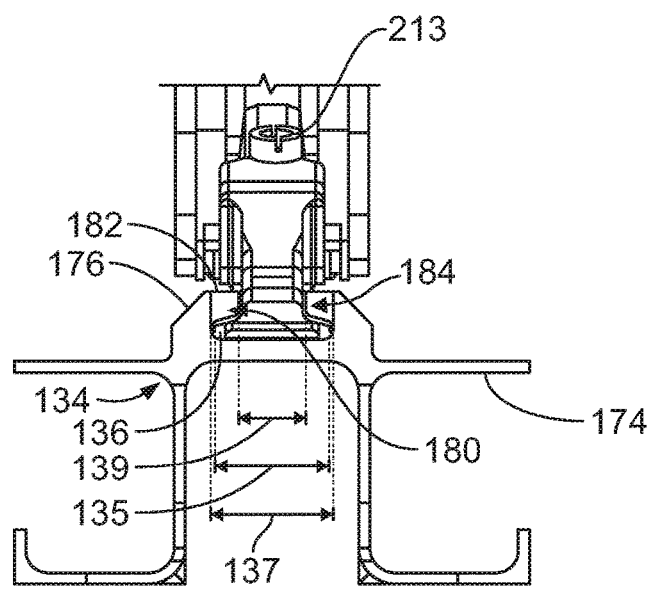
FIG. 5 illustrates an end view of a securing stud within a track channel of a seat track, according to an embodiment of the present disclosure.

FIG. 5 illustrates an end view of a securing stud 136 within a track channel 184 of a seat track 134, according to an embodiment of the present disclosure. Referring to FIGS. 3-5, the securing studs 136 of the seat assembly 100 may have a circular cross section and a width 135 that is less than a width 137 of the expanded openings 180. The width 135 is greater than a width 139 of the opening between opposed retaining arms 182. As such, when the securing studs 136 are positioned directly beneath the retaining arms 182, the securing studs 136 are locked in position, such that they are unable to eject through the opening between the retaining arms 182, thereby securely coupling the seat assembly 100 to the seat track 134. In contrast, when the securing studs 136 are shifted into the track channel 184 below or into the expanded openings 180, the securing studs 136, and therefore the legs 132 of the seat assembly 100, may be lifted out of the seat track 134.

In order to adjust the seat assembly 100 to a different longitudinal position, a lock fitting 213 (such as a bolt or other such fastener) is manipulated to unlock the legs 132. For example, the lock fitting 213 may be loosened such that a distal end no longer engages a portion of the seat track 134. Optionally, the seat assembly 100 may not include lock fittings.

After the lock fitting 213 disengages from the seat track 134, the seat assembly 100 may be longitudinally shifted in relation to the seat track 134. The seat assembly 100 is shifted so that the securing studs 136 are no longer underneath the retaining arms 182, but are instead within the expanded openings 180. After the securing studs 136 are in the expanded openings 180, the seat assembly 100 may be removed from the seat track 134, and/or moved to a different position on the seat track 134 via a seat adjustment system.

The seat assembly 100 may be shifted to different positions through various systems and methods. For example, the seat assembly 100 may be lifted and moved to a different position. In at least one other embodiment, the seat assembly 100 may be moved to a different position through rollers, indexing wheels, glides, sliders, and/or the like.

Figure 6:
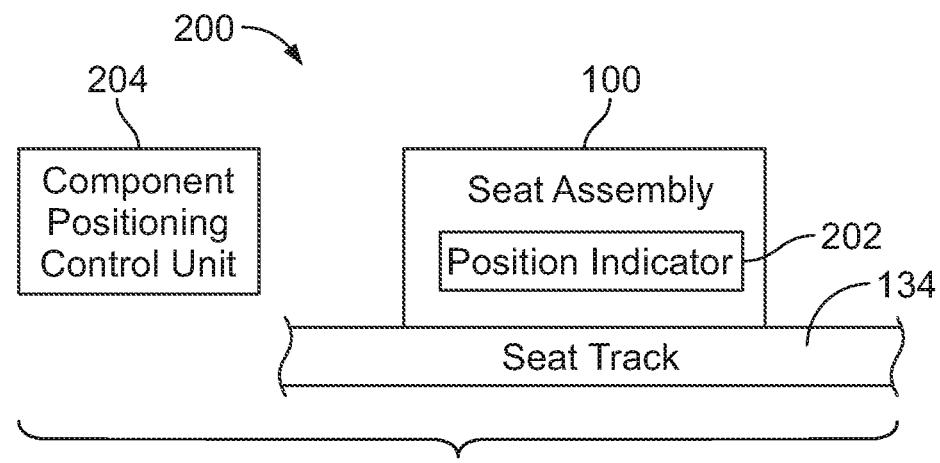
FIG. 6 illustrates a schematic block diagram of a component positioning system, according to an embodiment of the present disclosure.

FIG. 6 illustrates a schematic block diagram of a component positioning system 200, according to an embodiment of the present disclosure. The component positioning system 200 includes at least one position indicator 202 having a housing coupled to a portion of a component, such as the seat assembly 100. In at least one embodiment, the position indicator 202 is integrally formed with a portion of the component. For example, the position indicator 202 may be integrally formed with (in contrast to be separately mounted to) a leg or other portion of the seat assembly 100. The position indicator 202 may be coupled to various other types of components within an internal cabin, such as a lavatory, a closet, a galley, a PSU, or the like, which may or may not be directly coupled to the seat track 134 through one or more fittings.

As an example, the position indicator 202 may be coupled to a leg 132 (shown in FIG. 3) of the seat assembly 100. The seat assembly 100 is positioned on the seat track 134. The seat assembly 100 may be moved between positions on the seat track 134 and secured into a desired position.

The position indicator 202 is in communication with a component positioning control unit 204, such as through one or more wired connections. In at least one embodiment, the component positioning control unit 204 is on or within the seat assembly 100. In at least one other embodiment, the component positioning control unit 204 is remotely located from the seat assembly 100, such as within an internal cabin of a vehicle. In at least one other embodiment, the position indicator 202 includes the component positioning control unit 204.

The component positioning control unit 204 is also in communication with a memory that stores a proper position of the seat assembly 100 with respect to the seat track 134. In at least one embodiment, the component positioning control unit 204 includes the memory. In at least one other embodiment, the component positioning control unit 204 is in communication with a separate and distinct memory that is remote from the component positioning control unit 204 through one or more wired or wireless connections.

In at least one embodiment, the component positioning control unit 204 is also in communication with a component position identification system. The component position indication system tracks the current position of a component (for example, the seat assembly 100), such as within an internal cabin of a vehicle. As an example, the seat assembly 100 may include one or more sensors that output a position signal detected by a monitoring system, such as through radio frequency identification (RFID) sensors, electromagnetic sensors, inertial motion sensors, light/laser positioners, image recognition via cameras, and/or the like.

In operation, the component positioning control unit 204 compares the current position of the seat assembly 100 on the seat track 134 with a stored proper position for the seat assembly 100. The component positioning control unit 204 determines if the seat assembly 100 is in the proper position, such as with respect to the seat track 134. If the seat assembly 100 is in the proper position, the component positioning control unit 204 outputs a proper position signal to the position indicator 202. In response, the position indicator 202 emits a proper position indication. If the seat assembly 100 is not in the proper position, the component positioning control unit 204 outputs a remedial position signal to the position indicator 202, which indicates that the seat assembly 100 is not in the proper position. In at least one embodiment, the remedial position signal may also indicate a direction of correction. In response, the position indicator emits a remedial position indication.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the component positioning control unit 204 may be or include one or more processors that are configured to control operation thereof, as described herein.

The component positioning control unit 204 is configured to execute a set of instructions that are stored in one or more data storage units or elements (such as one or more memories), in order to process data. For example, the component positioning control unit 204 may include or be coupled to one or more memories. The data storage units may also store data or other information as desired or needed. The data storage units may be in the form of an information source or a physical memory element within a processing machine.

The set of instructions may include various commands that instruct the component positioning control unit 204 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the component positioning control unit 204. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the component positioning control unit 204 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 7:
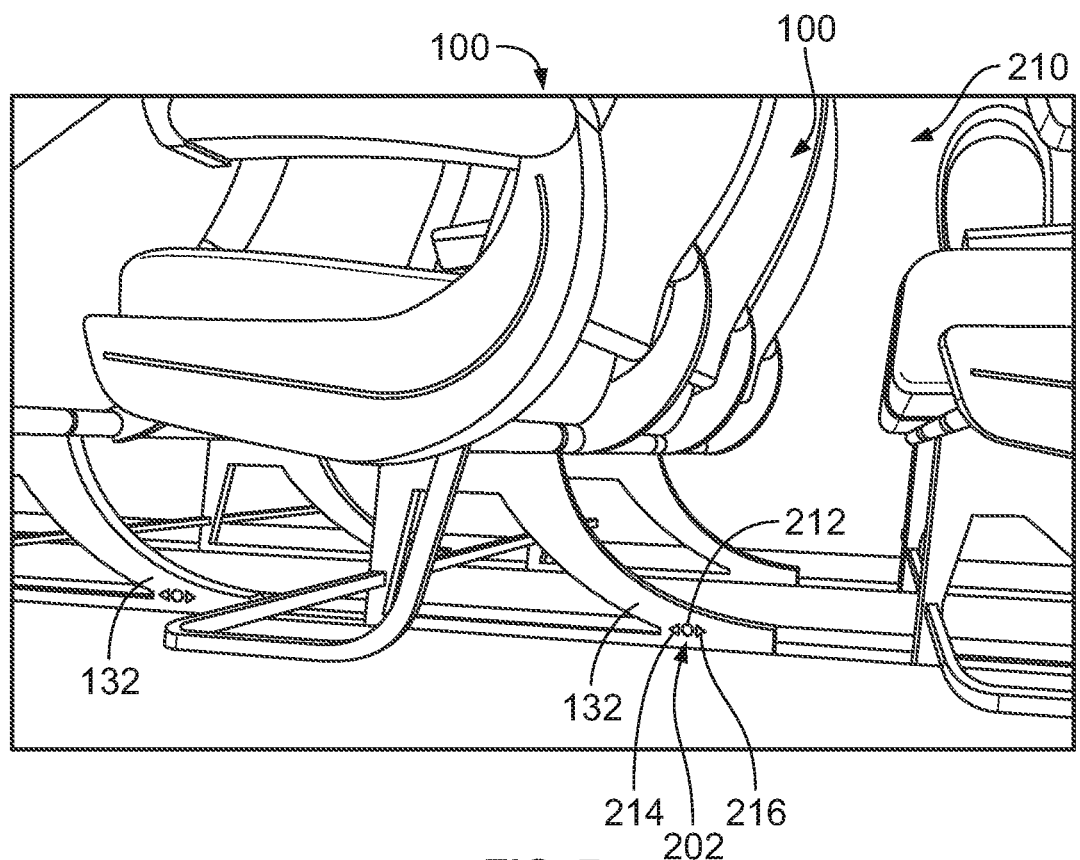
FIG. 7 illustrates a perspective view of seat assemblies secured to a seat track within an internal cabin, according to an embodiment of the present disclosure.

FIG. 7 illustrates a perspective view of seat assemblies 100 secured to a seat track 134 within an internal cabin 210, according to an embodiment of the present disclosure. As shown, one or more of the seat assemblies 100 includes a position indicator 202. For example, the position indicator 202 may be coupled to an aft leg 132 of the seat assembly 100, proximate to one or more securing studs 136 (as shown in FIG. 3). Locating the position indicator 202 proximate to the securing studs 136 allows for a readily discernable guide for locking the seat assembly 100 to the seat track 134 where such locking occurs. Optionally, the position indicator 202 may be coupled to various other portions of the seat assembly 100, such as a fore leg, a spanner bar, a base, an armrest, or the like.

In at least one embodiment, the position indicator 202 includes a status portion 212 and one or more corrector portions 214 and 216. The status portion 212 and the correction portions 214 and 216 include illuminators that are configured to be illuminated in response to signals received from the component positioning control unit 204. The illuminators may be or include light emitting diodes (LEDs), incandescent lights, fluorescent lights, and/or the like. In at least one other embodiment, the position indicator 202 includes a display, such as a digital display, that is configured to emit indications through text, graphics, or the like. In at least one other embodiment, the position indicator 202 may be or include a speaker that is configured to emit indications through audio signals.

FIG. 8 illustrates a front view of the position indicator 202 in a deactivated state, according to an embodiment of the present disclosure. In the deactivated state, the status portion 212 and the corrector portions 214 and 216 are not illuminated. In at least one embodiment, the position indicator 202 is operatively coupled to an activation device, such as a switch, that is engageable to selectively activate and deactivate the position indicator 202.

FIG. 9 illustrates a front view of the position indicator 202 emitting a proper position indication, according to an embodiment of the present disclosure. As shown, the status indicator 212 may indicate a proper position by emitting light at a first wavelength, such as a green light.

FIG. 10 illustrates a front view of the position indicator emitting a first remedial position indication 220, according to an embodiment of the present disclosure. As shown, the corrector portions 214 and 216 may be arrows indicating directions for remedying an improper position of the seat assembly 100. The first remedial position indication 220 includes the status indicator 212 indicating an improper position by emitting light at a second wavelength, such as a red light. Further, a remedial indication may be emitted by the corrector portion 216 being illuminated to provide a guide for correcting the position (such as movement aft).

FIG. 11 illustrates a front view of the position indicator emitting a second remedial position indication 222, according to an embodiment of the present disclosure. The second remedial position indication 222 includes the status indicator 212 indicating an improper position by emitting light at the second wavelength. Further, a remedial indication may be emitted by the corrector portion 214 being illuminated to provide a guide for correcting the position (such as movement fore).

FIG. 12 illustrates a flow chart of a component positioning method configured to facilitate positioning of a component in relation to a seat track within an internal cabin of a vehicle, according to an embodiment of the present disclosure. Referring to FIGS. 6 and 12, at 300, the position indicator 202 is coupled to a portion of a component. For example, the position indicator 202 is mounted on or integrally formed with a portion of the seat assembly 100. At 302, the component positioning control unit 204 determines if the component is in a proper position in relation to the seat track 134. If the component is in the proper position, the component positioning control unit 204 outputs a proper position signal, which is received by the position indicator 202, which emits in response, at 304, a proper position indication, thereby indicating that the component is in a proper position in relation to the seat track. If, however, the component is not in the proper position 302, the component positioning control unit 204 outputs an improper position signal, which is received by the position indicator 202, which emits in response, at 306, a remedial position indication, thereby indicating that the component is not in the proper position in relation to the seat track. At 308, the component is repositioned, and the method returns to 302.

In at least one embodiment, the coupling includes coupling the position indicator 202 proximate to at least one securing stud that secures the component to the seat track 134. The coupling may include providing a status portion, and one or more corrector portions. The providing may include providing one or more arrows indicating directions for remedying an improper position of the component.

In at least one embodiment, the method includes comparing, by the component positioning control unit 204, a current position of the component in relation to the seat track 134 with stored proper position data for the component within the internal cabin.

Referring to FIGS. 1-12, in at least one embodiment, a position indicator 202 includes a memory that stores position information for a component, such as the seat assembly 100. In at least one embodiment, the position indicator 202 also includes a position sensing device, as described herein. In at least one embodiment, the position indicator 202 stores past positioning data, which may accelerate a positional difference evaluation with respect to a current position upon activation.

Positional difference evaluation, such as by the component positioning control unit 204, may be performed via transmission of wireless signals, wired connections to interior structures, or the like. In at least one embodiment, desired locations of interior items are transmitted throughout the interior cabin and may be repeated, canceled, or corrected as long as the system is activated. In such case, each position indicator may have a unique identifier, for example a serial number, and extracts an appropriate desired location from the desired location data set through correlation with the unique identifier. With both data elements present, the component positioning control unit 204 performs a positional difference evaluation.

In at least one embodiment, a status light may be red to indicate that the seat assembly 100 is in not in the correct location and may be green once the desired location is achieved. Similarly, lighted arrows illuminate to show the remedial translation direction. In at least one embodiment, the direction signal may also include an indication of the magnitude of the remedial displacement. For example, the lighted arrows indicating fore and aft motion may blink a number of times corresponding to the number of inches to be moved, then pause for a short time. The blinking scheme may be continually updated as the item is moved such that the number of blinks reduces to zero as the item approaches the desired location.

In at least one other embodiment, the position indicator does not perform the positional difference evaluation itself. Rather, it may transfer its initial location to a separate device which receives the set of positions from all position indicators within an internal cabin. The device (such as a remote component positioning control unit) then performs the difference evaluations for each seat assembly and transfers either the new locations or simply the physical translation distances and directions back to the position indicators.

Power to run the position indicators may be supplied through a wired power connection, inductive power transfer, internal storage device such as a battery, or an energy harvesting device.

In at least one embodiment, position indicators may be attached to various other components within an internal cabin other than seat assemblies. For example, position indicators maybe coupled to seat assemblies, lavatories, galleys, PSUs, closets, and the like within an internal cabin. They may also be attached to components that are intended to be removed more frequently such as cargo containers, pallets and other irregular items. As such, especially in the case of more transient components, the position indicators may be communicatively coupled to systems such as those used to calculate, document, and/or ensure that a vehicle is appropriately loaded with respect to the weight and balance requirements.

In at least one embodiment, the position indicator is integrated into a fitting that also serves as a mechanical and, optionally, an electrical connection between the seat assembly and the floor or sidewall structure within the internal cabin. For example, the position indicator may be integrated into a securing stud, lock fitting, or the like that secures the component to a seat track.

The position indicators may be used to guide fore and aft positioning within an internal cabin. The position indicators may also be used with respect to other positioning within an internal cabin, such as lateral and vertical positioning.

In at least one embodiment, a configuration of an internal cabin of a vehicle, such as a commercial aircraft, is in a first configuration. The configuration of the internal cabin is to be changed to a second configuration. Location data for the second configuration is transferred to one or more positioning indicators aboard the vehicle. In at least one embodiment, each individual positioning indicator device evaluates a difference between a position in the first configuration and a position in the second configuration. Each positioning indicator device may indicate a position status and direction that the component (such as a seat assembly, a monument, a PSU, or the like) is to be moved in order to arrive at the position in the second configuration. The components are moved as indicated, and secured.

As described herein, embodiments of the present disclosure provide efficient systems and methods for properly positioning components (such as seats) within an internal cabin of a vehicle. Further, embodiments of the present disclosure provide systems and methods that allow for quick and efficient adjustment of components within an internal cabin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A component positioning system configured to facilitate positioning of a component in relation to a seat track within an internal cabin of a vehicle, the component positioning system comprising:
    a component that is moveable in relation to the seat track; and
    a position indicator secured to a portion of the component, wherein the position indicator emits a proper position indication when the component is in a proper position in relation to the seat track, and
    wherein the position indicator emits a remedial position indication when the component is not in the proper position in relation to the seat track.

2. The component position system of claim 1, wherein the component is a seat assembly.

3. The component positioning system of claim 2, wherein the position indicator is on a leg of the seat assembly.

4. The component position system of claim 1, wherein the position indicator is proximate to at least one securing stud that secures the component to the seat track.

5. The component positioning system of claim 1, further comprising a component positioning control unit.

6. The component positioning system of claim 5, wherein the component positioning control unit is on or within the component.

7. The component positioning system of claim 5, wherein the component positioning control unit is remote from the component.

8. The component positioning system of claim 5, wherein the position indicator includes the component positioning control unit.

9. The component positioning system of claim 5, wherein the component positioning control unit compares a current position of the component in relation to the seat track with stored proper position data for the component within the internal cabin.

10. The component positioning system of claim 1, wherein the position indicator comprises:
   a status portion; and
   and one or more corrector portions.

11. The component positioning system of claim 10, wherein the status portion and the one or more correction portions comprise illuminators that are configured to be illuminated.

12. The component positioning system of claim 10, wherein the one or more corrector portions comprise one or more arrows indicating directions for remedying an improper position of the component.

13. A component positioning method configured to facilitate positioning of a component in relation to a seat track within an internal cabin of a vehicle, the component positioning method comprising:
   securing a position indicator to a portion of a component;
   emitting a proper position indication when the component is in a proper position in relation to the seat track; and
   emitting a remedial position indication when the component is not in the proper position in relation to the seat track.

14. The component position method of claim 13, wherein the component is a seat assembly.

15. The component position method of claim 13, wherein the securing comprises securing the position indicator proximate to at least one securing stud that secures the component to the seat track.

16. The component positioning method of claim 13, further comprising comparing, by a component positioning control unit, a current position of the component in relation to the seat track with stored proper position data for the component within the internal cabin.

17. The component positioning method of claim 13, wherein the coupling comprises providing a status portion, and one or more corrector portions.

18. The component positioning method of claim 17, wherein the providing comprises providing one or more arrows indicating directions for remedying an improper position of the component.

19. A vehicle comprising:
   an internal cabin;
   a seat track within the internal cabin;
   a component positioned in relation to the seat track; and
   a component positioning system configured to facilitate positioning of the component in relation to the seat track within the internal cabin, the component positioning system comprising:
      a position indicator secured coupled to a portion of the component; and
      a component positioning control unit that compares a current position of the component in relation to the seat track with stored proper position data for the component within the internal cabin,
      wherein the position indicator emits a proper position indication when the component is in a proper position in relation to the seat track, and
      wherein the position indicator emits a remedial position indication when the component is not in the proper position in relation to the seat track.

20. The vehicle of claim 19, wherein the component is a seat assembly, and wherein the position indicator is secured to a leg of the seat assembly, and wherein the position indicator is proximate to at least one securing stud that secures the component to the seat track.

* * * * *